United States Patent [19]

Terry

[11] 4,042,219
[45] Aug. 16, 1977

[54] MECHANICAL AEROBIC COMPOSTER

[76] Inventor: Morris B. Terry, R.D. No. 1, Gilbertsville, N.Y. 13776

[21] Appl. No.: 636,940

[22] Filed: Feb. 18, 1976

[51] Int. Cl.² .............................................. B01F 9/02
[52] U.S. Cl. ................................................... 259/88
[58] Field of Search ................... 259/81 R, 88, 89, 90, 259/15, 34, 49, 53, 57, 191, 3, 85, 81 A, 109, 110, 174, 175, 176, 177 R, 177 A; 71/9; 23/259.1

[56] References Cited

U.S. PATENT DOCUMENTS

| 247,330 | 9/1881 | Franklin | 259/88 |
| 440,651 | 11/1890 | Parkhurst | 259/174 X |
| 554,206 | 2/1896 | Wiselogel | 23/259.1 X |
| 3,357,812 | 12/1967 | Snell | 71/9 |
| 3,751,014 | 8/1973 | Waterloo | 259/191 |
| 3,845,939 | 11/1974 | Waldenville | 23/259.1 X |
| 3,890,129 | 6/1975 | Chester | 259/89 X |

Primary Examiner—Philip R. Coe

[57] ABSTRACT

An apparatus for continuous aerobic processing of waste material to convert it completely into usable compost without the aid of inoculums. This apparatus consists of a drum which revolves about a fixed hollow shaft to which three vanes are affixed. One of these vanes is octahedral and the other two are tetrahedral in shape. They are positioned in such a way as to deflect waste material from the center to the ends of the container and from the ends to the center of the container. Within the central vane is the remote sensor of a dial thermometer, used to monitor the temperature inside the pile of waste material.

4 Claims, 3 Drawing Figures 4,042,219

MECHANICAL AEROBIC COMPOSTER

BACKGROUND OF THE INVENTION

1. Field of the Invention

This invention relates to mechanical methods of composting, having for its primary purpose the production of compost by a continuous aerobic process.

2. Description of the Prior Art

The prior art includes several composting devices designed for either aerobic or anaerobic processing or a combination of both. In a couple of these inventions, the shaft rather than the container is rotated. Another incorporates a shredder and an electric motor, and at least one of these inventions is not suitable for home use. None of the patented, manually operated composting devices which are suitable for home use can convert waste material to compost as quickly and with as little effort required as the present invention.

SUMMARY OF THE INVENTION

The present invention consists of a drum that revolves about a fixed hollow shaft to which three vanes are affixed at right angles to one another. In addition, it includes a thermometer for monitoring the temperature inside the pile of waste material. The drum is perforated by a series of holes which allow drainage of excess water and adequate ventilation so that the aerobic composting process can proceed as quickly as possible.

The overall object of the invention is to rapidly and completely convert all organic waste material into compost. In an aerobic composting process, this can best be accomplished by ensuring that all parts of the waste material regularly change places within the container. Hence the present device incorporates vanes which are shaped and positioned in such a way as to thoroughly mix the material each time the apparatus is actuated. Rotating the drum for three to five revolutions once a day is all that is required for the composting process to proceed at the fastest possible rate.

A collateral object of the invention is to monitor the composting process by means of a thermometer whose sensor is located inside the octahedral vane near the center of the pile of waste material. The temperature inside the pile should rise to 110°–120° F. within 24 to 48 hours after the process was begun. Within three to four days after the start, the pile should register at least 130° F., and it should stay at that temperature until all of the readily decomposable material is stabilized. At that point, the temperature will drop. When it drops to around 110° F. and does not rise again within two hours of revolving the drum, the compost is ready for use.

A further object is to provide a device which is simply constructed, comprises relatively few parts and is durable enough to withstand the strain exerted upon it.

DETAILED DESCRIPTION

Figure 1:
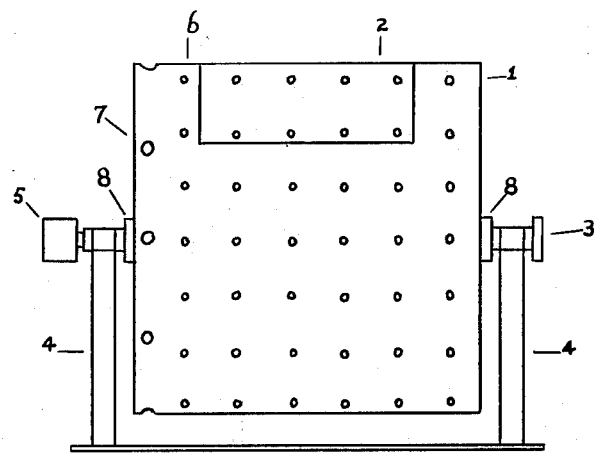
FIG. 1 is an exterior view from the side of the apparatus.

Referring first to FIG. 1, waste is deposited through a door 2 into the drum 1. Supported by bearings 8, the drum revolves about a stationary, hollow shaft 9. It is perforated by a series of holes to permit free movement of air and drainage of excess water.

Figure 2:
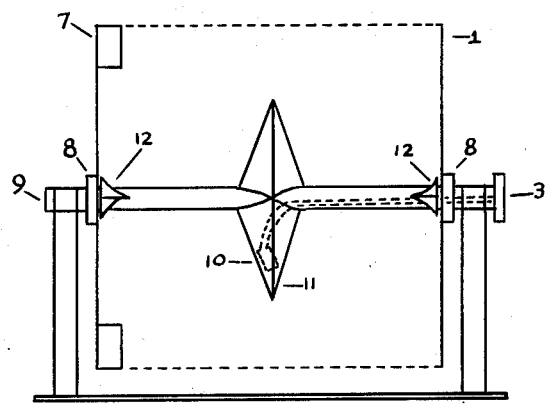
FIG. 2 is a broken-away interior view from the side of the apparatus.
Figure 3:
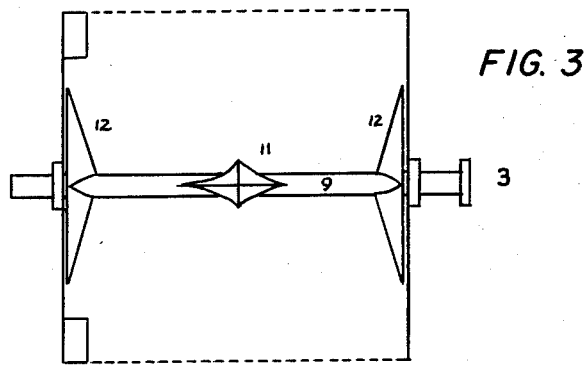
FIG. 3 is a broken-away interior view from the top of the apparatus.

Affixed to the hollow shaft are three vanes (FIGS. 2 and 3). The vane 11 which is joined to the shaft at its midpoint is octahedral in shape, while the vanes 12 attached to each end of the shaft within the drum are tetrahedral and positioned at right angles to the central vane. When the drum revolves, waste material tumbles from the outside, next to the inner surface of the drum, to the inside, near the shaft. As it strikes the central vane, it is deflected toward either end of the drum; and as it strikes the tetrahedral vanes, it is deflected back toward the center.

As shown in FIG. 2, the sensor 10 of the thermometer is lodged inside the central vane. The temperature can be monitored by means of the thermometer's dial 3, connected to the sensor by a line running through the hollow shaft.

The shaft is supported by legs 4. When inserted into projecting pieces of tubing 7, a handle 5 can be employed to rotate the drum. When not in use, the handle is stored within the hollow shaft.

What is claimed is:

1. Composting apparatus comprising: a rotatable enclosure means of generally elongated shape and including side walls and end walls defining a general cylindrical internal space, said enclosure means having one closeable access aperture, and said enclosure means being perforated with a plurality of holes; agitation means within said enclosure means consisting of a hollow shaft to which are secured three vanes, said vanes consisting of a central, octahedral vane and two tetrahedral vanes which tetrahedral vanes are affixed, respectively, to each end of said shaft, said vanes positioned so that the central, octahedral vane is perpendicular to the tetrahedral vanes, said shaft being journally supported by said enclosure means end walls axially through said cylindrical internal space.

2. Composting apparatus as set forth in claim 1 which is further characterized to include:
   ground support means consisting of frame support members secured to each end of said hollow shaft externally of said enclosure means.

3. Composting apparatus as set forth in claim 1 which is further characterized in that:
   said encloseable access aperture is closeable by means of a hinged door with a clasp.

4. Composting apparatus as set forth in claim 1 which is further characterized in that:
   said octahedral vane, contains a temperature sensor connected to a dial thermometer which is located outside of said enclosure means.

* * * * *